United States Patent

Lo

Patent Number: 5,791,366
Date of Patent: Aug. 11, 1998

[54] FRANGIBLE QUICK DISCONNECT COUPLING

[75] Inventor: Bobby C. Lo, Irvine, Calif.

[73] Assignee: Preece Incorporated, Irvine, Calif.

[21] Appl. No.: 585,945

[22] Filed: Jan. 16, 1996

[51] Int. Cl.[6] .................................................. F16K 17/40
[52] U.S. Cl. ............................ 137/68.14; 137/614.04; 137/614.2
[58] Field of Search ......................... 137/68.14, 68.15, 137/614.03, 614.04, 614.2

[56] References Cited

U.S. PATENT DOCUMENTS

| | | | |
|---|---|---|---|
| 3,026,070 | 3/1962 | Sutton et al. | 137/68.14 X |
| 3,508,580 | 4/1970 | Snyder, Jr. | 137/614.04 |
| 3,750,703 | 8/1973 | Arita | 137/614.04 |
| 3,794,057 | 2/1974 | Badger | 137/68.15 |
| 3,797,510 | 3/1974 | Torres et al. | 137/68.14 |
| 3,866,638 | 2/1975 | Mingus et al. | 137/614.03 X |
| 3,938,564 | 2/1976 | Jones | 137/614.03 X |
| 4,597,413 | 7/1986 | Buseth | 137/614.04 |
| 4,921,000 | 5/1990 | King et al. | 137/68.14 |
| 4,971,096 | 11/1990 | Perrine | 137/614.03 X |
| 5,123,441 | 6/1992 | Hogue et al. | 137/614.03 X |

*Primary Examiner*—John Rivell
*Attorney, Agent, or Firm*—Leonard Tachner

[57] ABSTRACT

A frangible quick disconnect coupling having a coupler and a nipple, also referred to herein as coupling halves which are designed to automatically seal off fluid flow after impact in a modularized race car configuration to prevent fuel spillage. The shut-off mechanisms work under any impact condition, including tension, shear and bending breakaway The couplings are designed for equipment which has been modularized for a quick change environment. A radially floating mechanism allows the couplings to be connected under misaligned conditions for blind mating operation. This mechanism also protects the breakaway structure under severe vibration conditions. All leak paths are completely sealed off throughout the normal connect and disconnect operations to minimize fuel spillage. Streamlined flow passages are designed to minimize pressure loss. Coupling halves are designed for direct mounting to an engine manifold, fuel cell or other structure without hose attachment interfaces. The breakaway structure of the present invention is broken by impact force and the shut-off valve mechanism ejects debris and automatically closes valves in both coupling halves of the quick disconnect.

6 Claims, 7 Drawing Sheets

FRANGIBLE QUICK DISCONNECT COUPLING

BACKGROUND OF THE INVENTION

1. Field of the Invention

The present invention relates generally to the field of quick disconnect couplings of the type used to transfer liquids from one apparatus to another in a manner which permits quick connection or disconnection without spillage of the liquid therebetween The present invention relates more specifically to a frangible quick disconnect coupling which is especially useful in a race car to interconnect the engine and the fuel supply, such as a gas tank or fuel cell for transferring gasoline therebetween and which is designed to automatically seal off respective halves of the coupling after an impact, such as resulting from tension, shear or bending breakaway and that might otherwise produce fuel spillage which could create a catastrophic fire

2. Prior Art

When a race car or for that matter, any high speed vehicle is involved in a collision or impact, one of the most significant safety concerns is the danger of a gasoline fire resulting from the leakage of gasoline from either the fuel supply tank or the engine, such as through a ruptured hose that normally interconnects those two portions of the vehicle The likelihood of a gasoline leak from a rupture in a racing vehicle is exacerbated in more modern vehicle designs where racing car equipment is designed for a quick change environment by modulizing engine and fuel supply systems The need for a quick disconnect interface between a modularized engine and fuel cell has been previously recognized. As a result, there have been quick disconnect couplings in the prior art wherein a coupling half is affixed usually by means of a hose to the engine module and a coupling half is affixed usually by means of a hose to the fuel cell module. Unfortunately, such prior art frangible couplings suffer from a number of significant disadvantages. For example, typically such prior art frangible couplings require hoses that can be connected to the respective devices from which fluid flows through the coupling and to which fluid is delivered. The use of hoses makes it difficult to provide modular equipment for a quick change environment because access must be provided to permit interconnection of the coupling halves after the engine and fuel cell modules have been installed. Furthermore, such prior art frangible couplings do not normally provide for fluid shut-off during a variety of different impact conditions. By way of example, they may provide for shut-off during tension breakaway, but not bending or shear breakaway.

Consequently, there is still an ongoing need for a frangible coupling quick disconnect which is especially designed for use in a race car or high speed vehicle environment to automatically seal off both coupling halves after impact to prevent fuel spillage and to provide the shut-off mechanism operation under any impact condition, including tenison, shear, or bending breakaway. In addition, there is an ongoing need for a frangible coupling of the aforementioned type but which is designed for equipment quick change environments to allow the couplings to be connected under a blind mate condition and without the use of hoses or other flexible coupling devices that would otherwise require manual access to the region between the interconnected modules In addition, there is a need for a quick disconnect frangible coupling in which all leak paths are completely sealed off throughout normal connect and disconnect operation to minimize fuel spillage and which provides a streamline flow passage to minimize pressure loss during normally interconnected operation. Unfortunately, there is no prior art known to the applicant which meets all of the aforementioned requirements and thus the aforementioned needs still exist.

SUMMARY OF THE INVENTION

The present invention comprises a quick disconnect frangible coupling in which a uniquely designed coupler and nipple automatically seal off after impact to prevent fuel spillage. The shut-off mechanism is designed to operate under any impact conditions such as tension, shear or bending breakaway. The coupling halves are designed for equipment quick change environments. A radially floating mechanism allows the couplings to be connected under misaligned conditions for blind mate operation where each coupling half is connected directly to the corresponding structure being interconnected. Consequently, no manual access need be provided to mate the coupling halves and no hoses need be used. This floating mechanism also protects the breakaway structure under severe vibration conditions that may occur in normal operations without impact. In addition, the present invention utilizes a structure in which all leak paths are completely sealed off throughout the normal connect and disconnect operations to minimize fuel spillage In addition, the flow passage between the respective coupling halves is designed to minimize pressure loss by being streamlined. The breakaway structure of the present invention is broken by impact force and the shut-off valve mechanism elects debris and automatically closes valves in both coupling halves of the quick disconnect.

OBJECTS OF THE INVENTION

It is therefore a principal object of the present invention to provide a quick disconnect primarily for use in race cars of the type having modulized equipment for a quick change environment, the quick disconnect comprising a pair of mating coupling halves desgined to automatically seal off fuel flow after impact of the vehicle to prevent fuel spillage and wherein the shut-off mechanism operates under any impact conditions including tension, shear and bending breakaway It is an additional object of the present invention to provide a frangible quick disconnect primarily for use in race cars and comprising a pair of frangible coupling halves designed for an equipment quick change environment and having a radially floating mechanism which allows the couplings to be connected under misaligned conditions for blind mate operation.

It is still an additional object of the present invention to provide a frangible coupling quick disconnect primarily for race cars in which all leak paths are completely sealed off throughout the normal connect and disconnect operation to minimize fuel spillage.

It is still an additional object of the present invention to provide a frangible coupling quick disconnect primarily for use in race cars having a modulized structure, the quick disconnect being designed to obviate the use of hoses to interconnect an engine and a fuel cell wherein a breakaway structure is used to automatically seal off the fuel cell and the engine from fuel spillage and including a radially floating mechanism which allows couplings connected to the fuel cell and the engine to be interconnected under substantially misaligned conditions and also being designed to protect the breakaway structure of the quick disconnect under severe vibration conditions.

BRIEF DESCRIPTION OF THE DRAWINGS

The aforementioned objects and advantages of the present invention, as well as additional objects and advantages

3 thereof, will be more fully understood hereinafter as a result of a detailed description of preferred embodiments in which:

DETAILED DESCRIPTION OF PREFERRED EMBODIMENTS

First Embodiment

Referring now to FIGS. 1–6 and FIG. 1 in particular, it will be seen that a frangible quick disconnect coupling 10 comprises a coupler 11 having a coupler body 12 and a nipple 13 having a nipple body 14 and a nipple base 16. The nipple 13 also comprises a nipple poppet 18, a spring 20, a cap 22 and a retainer 24. The coupler 11 comprises a coupler poppet 28, a fuse pin 26, a coupler stem 30 and a spring 32. The frangible quick disconnect coupling 10 also provides a number of O-rings, including exterior O-ring 34, coupler seal O-ring 36, connection O-ring 38, connection O-ring 40, nipple body/base O-ring 42 and nipple seal O-ring 44.

Figure 2:
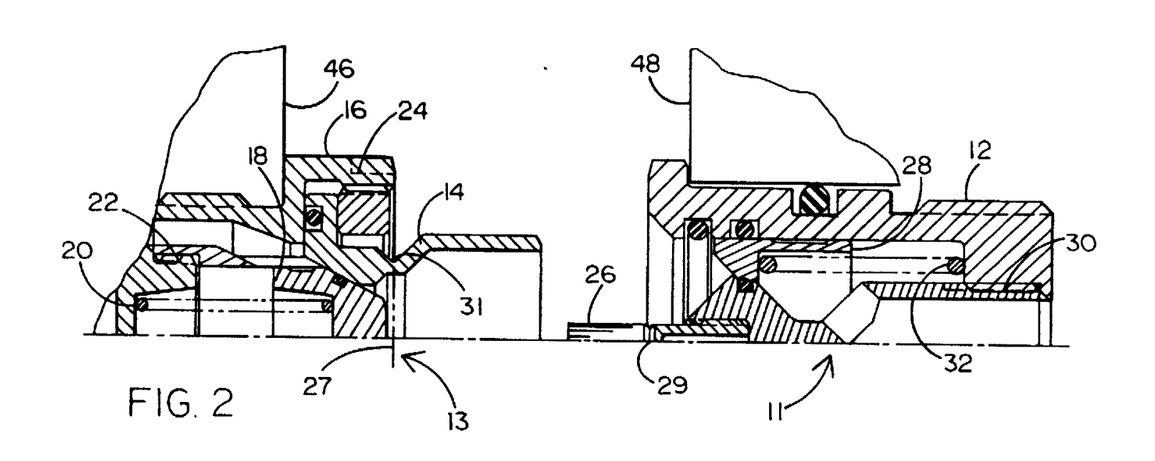
FIG. 2 is a schematic illustration showing the configuration of the first embodiment coupler and nipple of the present invention when they are separated from one another.

As seen in FIG. 2, each of the quick disconnect coupling halves, namely coupler 11 and nipple 13 are connected to respective modules, such as modules 46 and 48, so that when the coupler halves 11 and 13 are interconnected, fluid may flow between the two modules. Thus for example, in a race car, module 46 may be the engine of the race car and module 48 may be the fuel cell of the race car whereby upon interconnection of the quick disconnect coupling 10, by mating coupler 11 to nipple 13, fuel may flow from fuel cell 48 to engine 46. Thus, unlike most prior art quick disconnects, the quick disconnect coupling of the present invention is designed to provide a coupler and nipple which mate directly to removable, but otherwise fixed modules. When such modules are installed in appropriate relative

4 positions, they secure the coupling halves, namely the coupler 11 and the nipple 13 together in an interconnected configuration without any distinct mechanical interface holding the coupling halves together, such as for example, a threaded outer shell. Thus, it will be understood that if an impact occurs to the vehicle in which modules 46 and 48 are secured and if that impact results in an axial separation between the engine 46 and the fuel cell 48, the coupler 11 and nipple 13 will also readily separate, such as into the position shown in FIG. 2 wherein fuse pin 26 will be broken away from nipple 13 and the nipple body 14 would be broken away from the coupler 11. It will also be seen hereinafter that when the coupler and nipple are withdrawn from one another, each includes a spring operated valve configuration which closes automatically to prevent the flow of fluid therethrough. Consequently, for example if used with an engine and a fuel cell in a race car for example, the impact which would result in axial separation of the nipple and coupler, would thus prevent fuel from exiting the fuel cell 48 and it would also prevent fuel from backing out of engine 46, thus minimizing or entirely obviating the opportunity for fuel leakage as a result of such an impact. However, it will be also understood that the present invention also operates to automatically seal off both coupling halves after an impact which does not necessarily result in an axial separation between the two coupling halves. More specifically, in the present invention, in addition to tension breakaway as shown in FIG. 2, a unique design of the present invention also prevents fuel leakage or spillage after a breakaway due to shear or bending forces as well.

Figure 3:
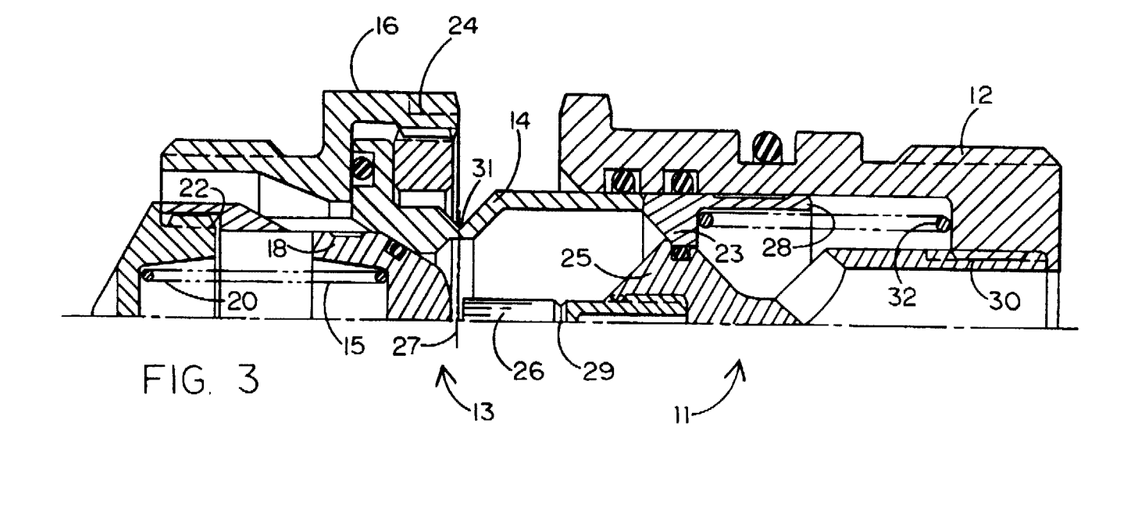
FIG. 3 is a schematic illustration of the present invention illustrating the first embodiment coupler and nipple thereof when they are partially interconnected.
Figure 4:
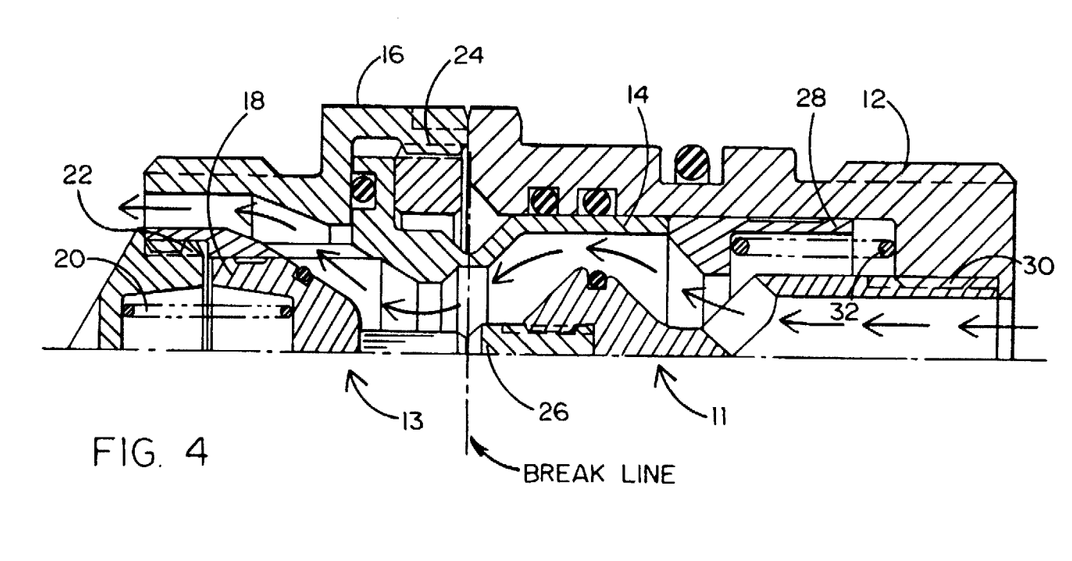
FIG. 4 is a schematic illustration of the first embodiment showing the coupler and nipple portions thereof fully interconnected and illustrating the flow path of fluid therethrough.

The normal connect or disconnect operation of the frangible quick disconnect coupling 10 of the present invention may be understood best by referring to FIGS. 3 and 4 which illustrate the shut-off configuration and open configuration, respectively. It will be seen that the opening and closing of the valve configurations of both the coupler 11 and the nipple 13, depends upon a pair of springs, namely spring 20 in nipple 13 and spring 32 in coupler 11. As seen in FIG. 3, when the coupler 11 and nipple 13 are not fully interconnected, springs 20 and 32 are fully extended. Therefore, spring 20 extends the nipple poppet 18 toward the nipple body 14 at a closure interface 15. Similarly, spring 32 in coupler 11 is fully extended and pushes the coupler poppet 28 until it comes in contact with a fuse pin holder 25, forming a closure interface 23. Coupler seal O-ring 36 and nipple seal O-ring 44 serve to make the respective closure interfaces leakproof.

If however, the two coupling halves, namely coupler 11 and nipple 13, are placed into their fully interconnected position, such as by installing the engine 46 adjacent the fuel cell 48, the springs 20 and 32, are respectively compressed. Spring 20 is compressed by the force of fuse pin 26 on the nipple poppet 18 which opens the closure interface 15, allowing fluid flow therethrough. Compression of spring 32 is achieved by the force of nipple body 14 on the coupler poppet 28 which opens the closure interface 23 and allowing fluid flow therethrough. Thus by comparing FIGS. 3 and 4, it will be seen that the coupler 11 is adapted to open the fluid flow path in the nipple 13 and the nipple 13 is adapted to open the fluid flow path in the coupler 11 when the respective coupling halves are interconnected in their fully abutting relation. Furthermore, it will be seen that as soon as the respective coupling halves are withdrawn from one another, such as shown in FIG. 3, or fully disconnected as shown in FIG. 2, springs 20 and 32 become fully extended, closing both closure interfaces in the nipple and coupler and thus sealing off fluid flow in both coupling halves.

Figure 5:
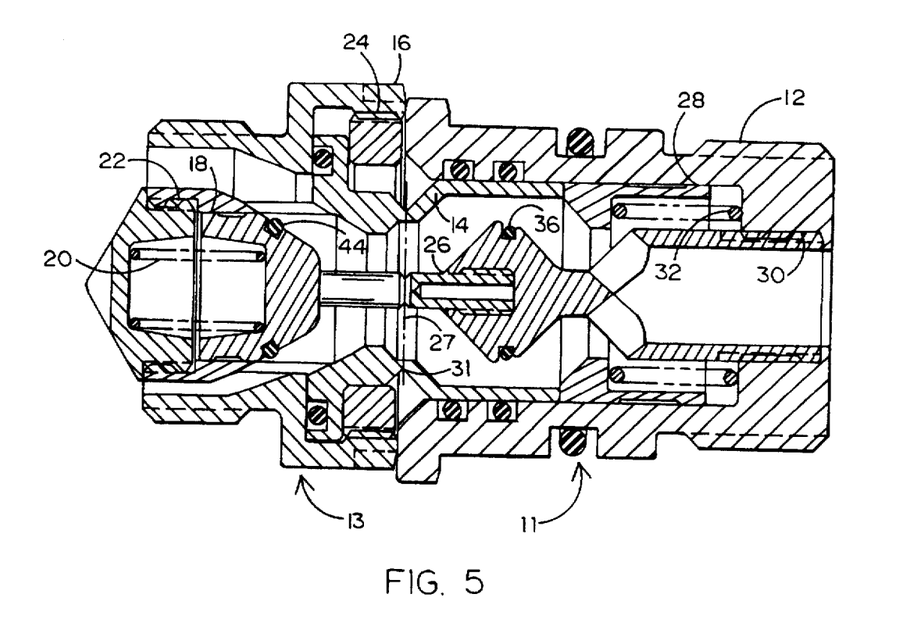
FIG. 5 is a schematic illustration of the first embodiment of the present invention showing the coupler and nipple portions thereof fully interconnected but illustrating a relative radial displacement of one with respect to the other.

In view of the blind mating operation in a quick change environment for which equipment this quick disconnect is designed, the coupler 13 has a radially floating mechanism which allows the couplings to be connected under misaligned conditions. Such a misaligned condition is shown in FIG. 5. As seen in FIG. 5, there is a spacing on either side of the cap 22 and poppet 18, relative to the nipple base 16 and this gap can be non-symmetrical as shown in FIG. 5. More specifically, as seen in FIG. 5, the nipple base 16 is displaced upwardly relative to the coupler body 12 and yet as shown therein, the fuse pin 26 of the coupler 11 is perfectly aligned with the nipple poppet 18, thus properly compressing springs 20 and 32 to permit unencumbered fluid flow through the quick disconnect coupling 10. This ability to interconnect the misaligned two coupling halves of the frangible quick disconnect 10 of the present invention, is particularly advantageous when used in a modularized quick change environment which allows for some degree of misalignment between the modules where it may be difficult, if not impossible, to observe the coupling halves as they are being interconnected by proper positioning of the respective modules to which they are connected. Thus, the present invention obviates the requirement for manual access at the interface between the modules where the coupling halves are positioned for relative connection and disconnection without hoses.

Figure 1:
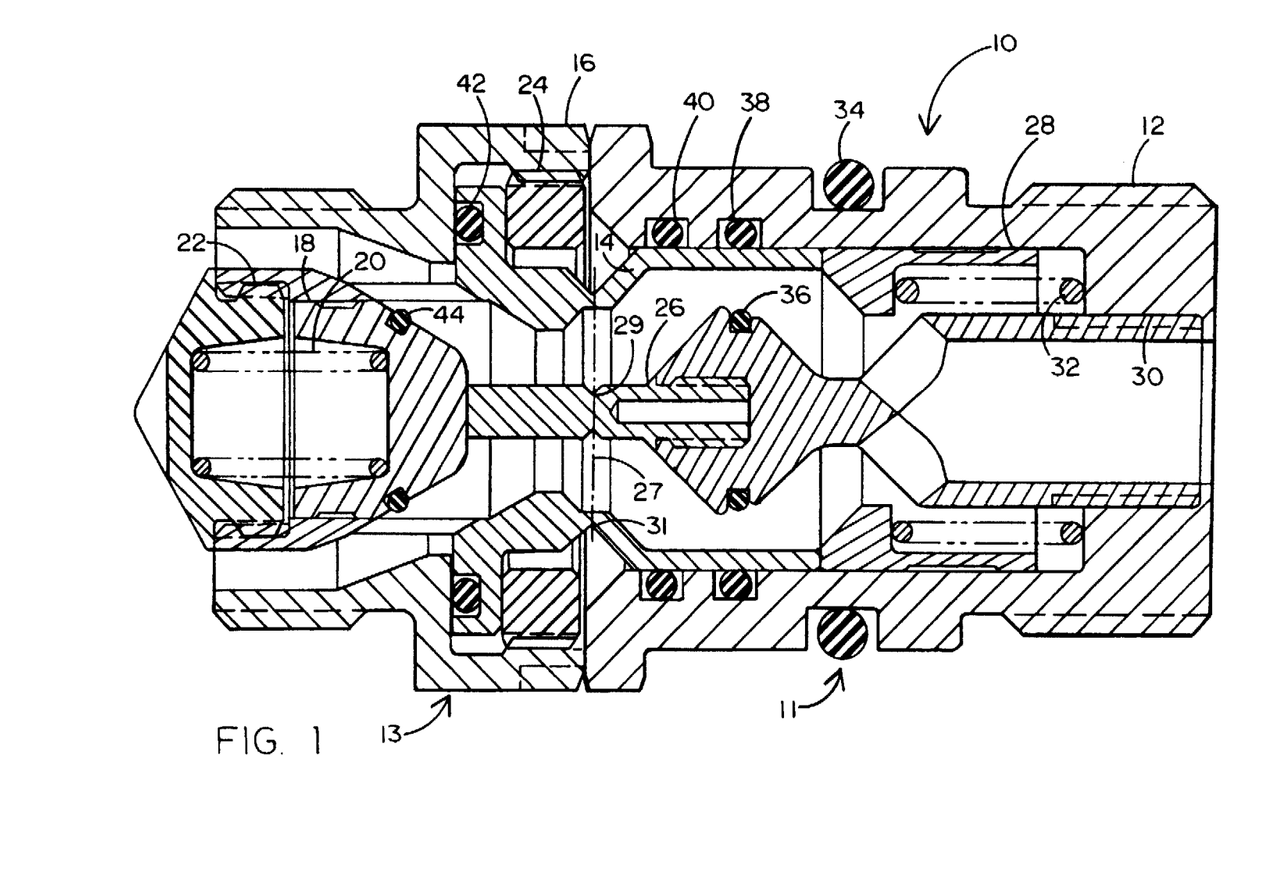
FIG. 1 is a schematic illustration of a first embodiment of a quick disconnect of the present invention shown with both the coupler and nipple fully interconnected in a normal conditon.
Figure 6:
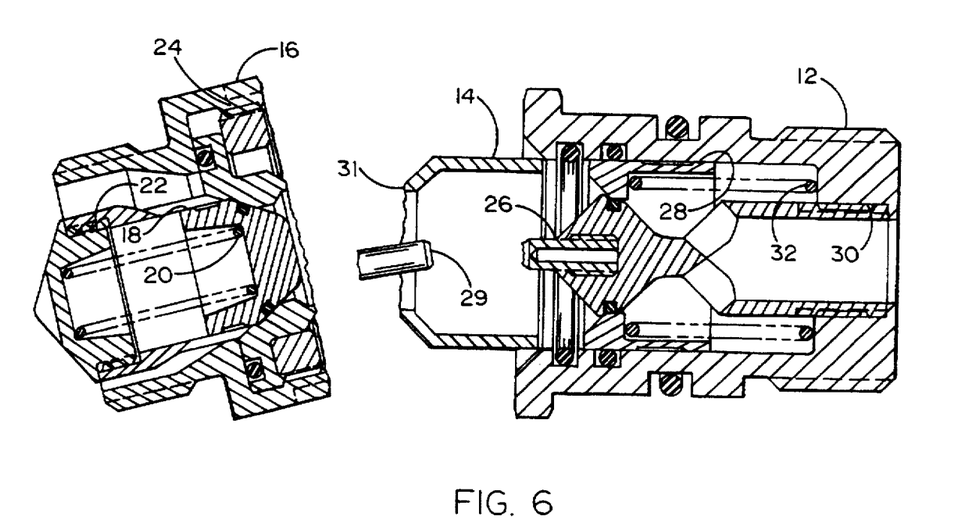
FIG. 6 is a schematic illustration of the first embodiment of the present invention showing the coupler and nipple portion and illustrating the closure of fluid flow in the respective coupling halves after an impact force sufficient to break away the nipple structure from the coupling structure.
Figure 7:
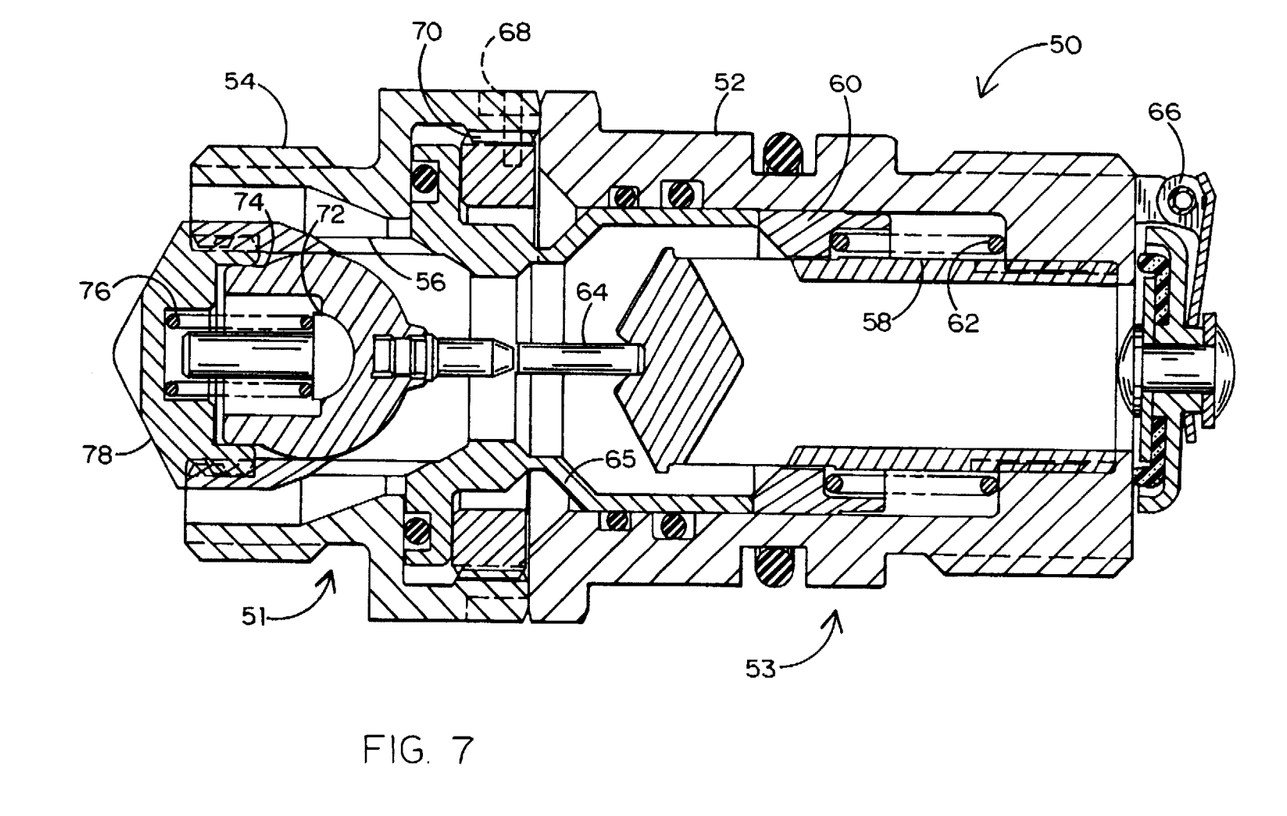
FIG. 7 is a schematic illustration of a second embodiment of the invention with nipple and coupler portions assembled, but without fluid flow therethrough.
Figure 8:
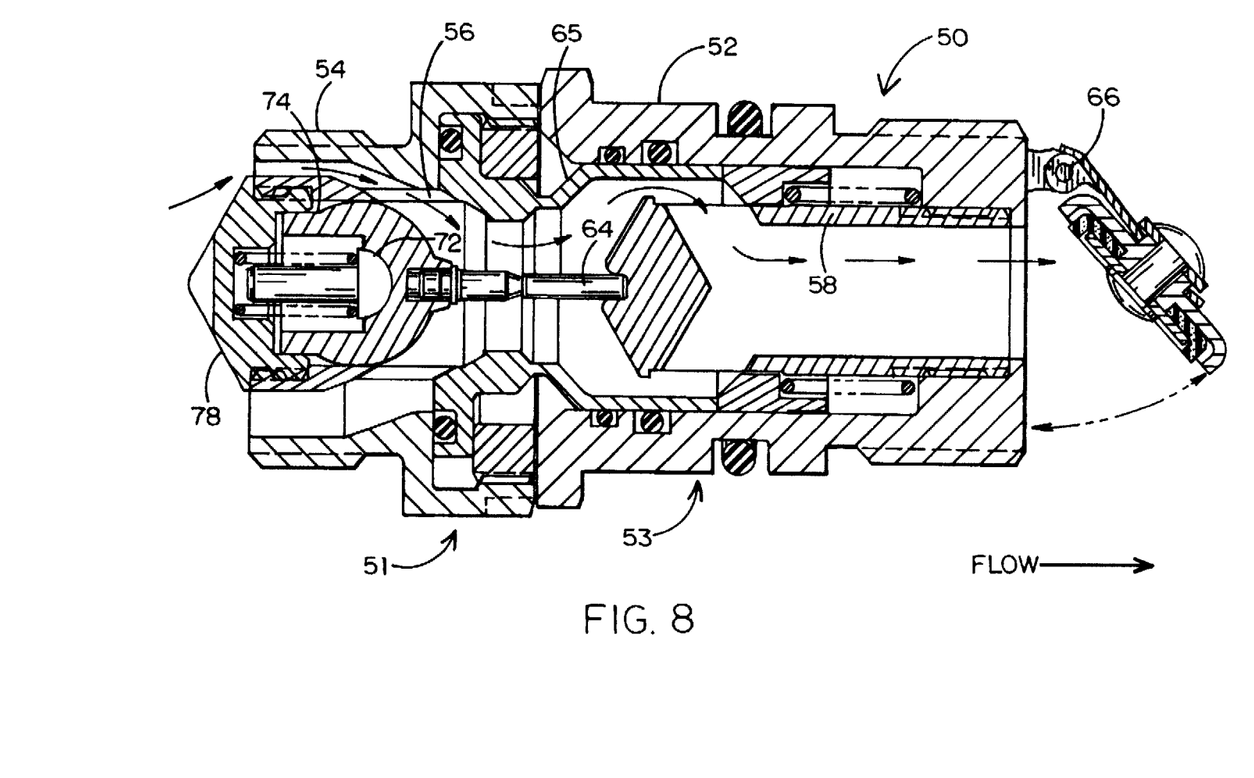
FIG. 8 is an illustration similar to that of FIG. 7, but with fluid flow through the quick disconnect.

FIG. 6 illustrates the main feature of the present invention, namely, the ability to seal off the respective coupling halves against fluid flow therethrough, despite an impact-induced breakaway between the respective halves under a number of different impact conditions such as tension, shear and bending breakaway. In the present invention, this is accomplished by the use of a fuse pin 26 which has a coupler break reduction 29 and the use of a nipple body 14 which has a nipple break reduction 31. As seen in FIG. 1, when the coupling halves 11 and 13 are fully interconnected, the coupler break reduction 29 and nipple break reduction 31 are aligned at a break line 27 along which, as shown in FIG. 6, the nipple body will break relative to the coupler body. This designed break line 27 is the point of breakage, irrespective of the direction of breakaway forces due to an impact. In other words, this will be the break line irrespective of whether the breakaway condition results from high force non-axial tension, shear or bending between the adjacent modules 46 and 48 and thus also between the coupling halves 11 and 13. It will be noted in FIG. 6 in particular, that despite the breakaway of the coupler 11 from the nipple 13, the springs 20 and 32 of both coupling halves have expanded, closing the respective closure interfaces 15 and 23, thereby preventing any fluid flow between the respective coupling halves 11 and 13.

Second Embodiment

Turning now to FIGS. 7–10, it will be seen that a second embodiment 50 of the invention herein comprises a nipple 51 and a coupler 53. Also identified therein are a coupler body 52, a nipple base 54, a nipple body 56, a coupler stem 58, a coupler poppet 60, a spring 62, fuses 64 and 65, a swing check-valve 66, a pin 68, a retainer 70, a pivot 72, a nipple poppet 74, a spring 76 and a cap 78. For the most part, like parts function as described in regard to the embodiment of FIGS. 1–6. The discussion herein will therefore address only the differences.

Figure 9:
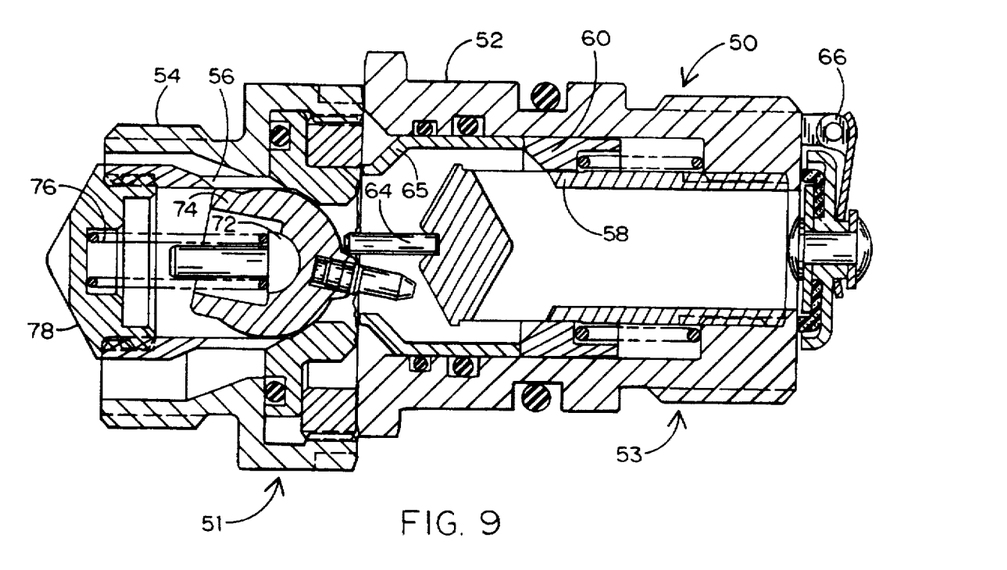
FIG. 9 is an illustration of the embodiment of FIGS. 7 and 8, shown after a transverse force-induced break between nipple and coupler.
Figure 10:
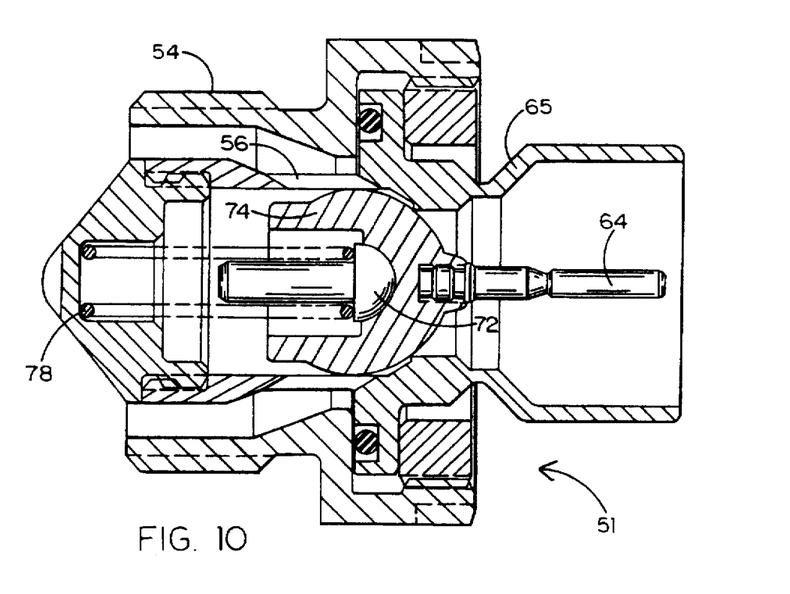
FIG. 10 is an illustration of the nipple only to more fully show the structure thereof.

Fuse 64 in the second embodiment is located at the nipple and is protected by the nipple housing to prevent accidental breakage during engine installation. FIG. 10 provides the best view of the fuse placement in the second embodiment. All internal O-rings of the first embodiment are replaced by contact seals (a smooth surface sits on a sharp corner). This prevents O-ring extrusion and swelling problems. A spherical poppet 72 permits closure of the poppet at a misaligned position and a swing check-valve 66 is added to the coupler. The fuel flow from nipple to coupler opens the check valve at a selected nominal pressure (i.e., 6 inches H O). Fuel stoppage permits the check valve to close thereby preventing leakage from the engine after impact. During impact, fuses 64 and 65 break simultaneously. The nipple poppet 74 is pushed forward by spring 76. In the event that debris is not cleared out of the way as shown in FIG. 9, the poppet 74 pivots around pivot 72 and re-aligns itself until the nipple is closed.

The nipple and coupler of the second embodiment do not require any axial separation to eject the debris before the valves can close. This differs from the embodiment of FIGS. 1–6 which requires some separation (e.g., 0.25 inches) after impact to eject the broken fuse and allow valve closure. Thus the second embodiment is more protective of the center fuse during installation and more reliable in stopping fuel flow after impact.

It will now be understood that what has been disclosed herein, comprises a frangible quick disconnect coupling having a coupler and a nipple, also referred to herein as coupling halves which are designed to automatically seal off fluid flow after impact in a modularized race car configuration to prevent fuel spillage. The shut-off mechanisms work under any impact condition, including tension, shear and bending breakaway. The couplings are designed for equipment which has been modularized for a quick change environment. A radially floating mechanism allows the couplings to be connected under misaligned conditions for blind mating operation. This mechanism also protects the breakaway structure under severe vibration conditions. All leak paths are completely sealed off throughout the normal connect and disconnect operations to minimize fuel spillage. Streamlined flow passages are designed to minimize pressure loss. Coupling halves are designed for direct mounting to an engine manifold, fuel cell or other structure without hose attachment interfaces. The breakaway structure of the present invention is broken by impact force and the shut-off valve mechanism ejects debris and automatically closes valves in both coupling halves of the quick disconnect.

Those having skill in the art to which the present invention pertains, will now as a result of the applicant's teaching herein, perceive various modifications and additions which may be made to the invention. By way of example, the precise shape and relative dimensions shown herein may be readily altered. In addition, various materials commonly used in quick disconnects and suitable for the type of fluid being transferred or interrupted by the quick disconnect couplings of the invention, may also be readily altered. Accordingly, all such modifications and additions which may be made to the invention are deemed to be within the scope thereof which is to be limited only by the claims appended hereto and their equivalents.

I claim:

1. A frangible quick disconnect coupling for facilitating fluid flow between two modules, one such module being a source of the fluid and the other such module being a receptacle of the fluid; the coupling comprising:

a nipple affixed to one said module and having a base and a nipple body coaxially interconnected by a retainer, the base radially surrounding a moveable nipple poppet and cap, the axial spacing between the nipple poppet and the cap being dependent upon the degree of compression of a nipple spring positioned between the nipple poppet and the cap, the flow of fluid through said nipple being blocked when said nipple spring is uncompressed permitting said nipple poppet to radially engage said nipple body and the flow of fluid through said nipple being unblocked when said nipple spring is compressed forcing said nipple poppet to withdraw from said nipple body;

a coupler affixed to the other said module having a fuse pin extending axially toward said nipple poppet along the axis of said coupler, said fuse pin extending from a fuse pin holder and a moveable coupler poppet, the relative position of said coupler poppet within said coupler body being dependent upon the degree of compression of a coupler spring positioned between said coupler poppet and said coupler body, the flow of fluid through said coupler being blocked when said coupler spring is uncompressed permitting said coupler poppet to radially engage said fuse pin holder and the flow of fluid through said coupler being unblocked when said coupler spring is compressed forcing said coupler poppet to withdraw from said fuse pin holder;

said nipple body pushing said coupler poppet to compress said coupler spring and said fuse pin pushing said nipple poppet to compress said nipple spring when said nipple and coupler are fully interconnected;

wherein each of said nipple body and said fuse pin comprises a break reduction for rendering said nipple and coupler frangible for predictable separation upon application of a non-axial impact force to said coupling whereby flow is blocked in both said nipple and coupler.

2. The coupling recited in claim 1 wherein in said nipple, said base is radially spaced from said nipple poppet, said cap and said nipple spring and wherein nipple poppet, said cap and said nipple spring are radially moveable relative to said base to permit axial misalignment between said nipple base and said coupler body while maintaining substantial alignment between said nipple poppet and said fuse pin.

3. The coupling recited in claim 1 wherein in said nipple, said nipple body is radially moveable relative to said base to permit misalignment between said base and said coupler body while maintaining substantial alignment between said nipple body and said coupler poppet.

4. The coupling recited in claim 1 wherein said fluid source module is a fuel source in a vehicle and said fluid receptacle module is an engine in said vehicle and said fluid is fuel for said vehicle.

5. The coupling recited in claim 1 wherein said fluid source module is a fuel tank in a vehicle and said fluid receptacle module is an engine in said vehicle and said fluid is fuel for said vehicle.

6. The coupling recited in claim 1 wherein said nipple and said coupler are affixed directly to respective ones of said modules without the use of intermediate hoses.

* * * * *